US008423869B2

(12) United States Patent
Shimanuki

(10) Patent No.: US 8,423,869 B2
(45) Date of Patent: Apr. 16, 2013

(54) DECODING APPARATUS, DECODING METHOD, AND PROGRAM

(75) Inventor: Noriyuki Shimanuki, Tokyo (JP)

(73) Assignee: NEC Corporation, Tokyo (JP)

( * ) Notice: Subject to any disclaimer, the term of this patent is extended or adjusted under 35 U.S.C. 154(b) by 224 days.

(21) Appl. No.: 12/810,091

(22) PCT Filed: Jan. 19, 2009

(86) PCT No.: PCT/JP2009/050614
§ 371 (c)(1),
(2), (4) Date: Jun. 22, 2010

(87) PCT Pub. No.: WO2009/107419
PCT Pub. Date: Sep. 3, 2009

(65) Prior Publication Data
US 2010/0332939 A1    Dec. 30, 2010

(30) Foreign Application Priority Data

Feb. 26, 2008  (JP) .................................. 2008-044377

(51) Int. Cl.
*H03M 13/45* (2006.01)
*H03M 13/27* (2006.01)
(52) U.S. Cl.
USPC .......................................... 714/774; 714/780
(58) Field of Classification Search ........................ None
See application file for complete search history.

(56) References Cited

U.S. PATENT DOCUMENTS

| 7,093,180 | B2 * | 8/2006 | Shin et al. ...................... 714/755 |
| 7,492,722 | B2 * | 2/2009 | Pietraski et al. ............... 370/252 |
| 2002/0049948 | A1 * | 4/2002 | Lee et al. ........................ 714/755 |
| 2007/0237217 | A1 * | 10/2007 | Shen et al. ..................... 375/227 |

FOREIGN PATENT DOCUMENTS

| JP | 2002152056 A | 5/2002 |
| JP | 2004007548 A | 1/2004 |
| JP | 2004304620 A | 10/2004 |
| JP | 2004335000 A | 11/2004 |
| JP | 2005057710 A | 3/2005 |
| JP | 2005176205 A | 6/2005 |
| JP | 2005531954 A | 10/2005 |
| JP | 2006506889 A | 2/2006 |
| JP | 2006304152 A | 11/2006 |
| JP | 2007006382 A | 1/2007 |
| JP | 2007509511 A | 4/2007 |

OTHER PUBLICATIONS

International Search Report for PCT/JP2009/050614 mailed Feb. 17, 2009.
Intel Corporation, "Comparison between Single and Multiple Codewords for Precoded MIMO", 3GPP TSG RAN WG1 #45, R1-061127, May 2006, pp. 1-7.
Qualcomm Europe, "Link Analysis of Single User MIMO—S-VAP vs. S-PARC", 3GPP TSG-RAN WG1 #44-bis, R1-060953, Mar. 2006, pp. 1-5.

* cited by examiner

*Primary Examiner* — Ajay Bhatia
*Assistant Examiner* — Dipakkumar Gandhi

(57) ABSTRACT

A decoding apparatus includes maximum decoding iteration count controller 52 which determines maximum decoding iteration counts of respective received code words based on modulation schemes and error-correcting coding ratios which are applied to the received code words and average error ratios of the received code words before the code words are decoded, and turbo decoding engine 53 which decodes each of the received code words according to a maximum decoding iteration count determined by maximum decoding iteration count controller 52.

6 Claims, 4 Drawing Sheets

DECODING APPARATUS, DECODING METHOD, AND PROGRAM

TECHNICAL FIELD

The present invention relates to a decoding apparatus, a decoding method, and a program for decoding received signals, and more particularly to a decoding technology for multiplex transmission.

BACKGROUND ART

Wireless communication systems available in recent years are constructed to achieve a throughput of about several hundreds Mbps based on the background technology of MIMO (Multiple Input Multiple Output) multiplex transmission. The MIMO multiplex transmission can employ multiple code word transmission for sending a large quantity of bits using the same frequency and time resource at the same time. A decoding process for the multiple code word transmission may be realized by as many decoders as the number of code words.

FIG. 1 is a diagram showing an example of a receiver using a plurality of decoders.

As shown in FIG. 1, the receiver includes channel estimator 110 for estimating channels using received signals of pilot symbols from respective transmission antennas, SNR estimator 120 for calculating SNRs (Signal to Noise Ratios) at respective reception antennas from the channels of the pilot symbols estimated by channel estimator 110, MIMO demodulator 130 for separating signals sent by way of MIMO multiplex transmission, decoding processor 150 for decoding code words from MIMO demodulator 130 using the LLR (Log Likelihood Ratio) of the code words, CRC checker 160 for performing a CRC check on estimated code words that are produced from decoding processor 150 which decodes the code words, and ACK/NAK signal generator 170 for generating information to be fed back to the transmitter. Decoding processor 150 includes turbo decoding engine 151 having as many turbo decoders 151-1, 151-2 as the number of the code words.

As many turbo decoders as the number of the code words make it possible to decode a large quantity of bits that have been sent using the same frequency and time resource at the same time.

JP No. 2007-6382A discloses a method of determining a maximum iteration count of each code block based on an allowed time that can be allocated to the iterative decoding in one frame, the number of code blocks in one frame, and the size of each code block.

The receiver which has as many iterative decoders as the number of code words, as described above, requires as many iterative decoders as the number of code words. If the number of code words is large, then the receiver needs to have a large circuit scale and finds it difficult to reduce the entire size thereof.

If different modulation schemes and different error-correcting coding ratios are applied to respective code words in the MIMO multiplex transmission, then since TBSs (Transport Block Sizes) are different, the iterative decoders have different processing times.

FIG. 2 is a diagram showing an example of decoding processing times at the time respective code words have different TBSs in turbo decoding engine 151 shown in FIG. 1.

As shown in FIG. 2, even if the processing of a code word with a small TBS is finished early, since feedback information is sent to the transmitter after ACK/NACK signals of all code words have been generated, the ACK/NACK signals to be fed back to the trans-mitter are governed by the processing time of a code word having a large TBS. Therefore, the decoding processor has a redundant configuration.

The technology disclosed in JP No. 2007-6382A alone is unable to process each of the received code words, and fails to solve the problems that arise if different modulation schemes and different error-correcting coding radios are applied to respective code words in the MIMO multiplex transmission.

DISCLOSURE OF THE INVENTION

It is an object of the present invention to provide a decoding apparatus, a decoding method, and a program which are capable of performing a decoding process in which the decoder has a reduced circuit scale even if different modulation schemes and different error-correcting coding ratios are applied to respective code words which are received.

To achieve the above object, there is provided in accordance with the present invention a decoding apparatus for decoding a plurality of code words when the code words are sent by way of multiplex transmission, comprising:

maximum decoding iteration count control means for determining maximum de-coding iteration counts of respective received code words based on modulation schemes and error-correcting coding ratios which are applied to the received code words and average error ratios of the received code words before the code words are decoded; and decoding executing means for decoding each of the received code words according to a maximum decoding iteration count determined by said maximum decoding iteration count control means.

There is also provided a decoding method for decoding a plurality of code words when the code words are sent by way of multiplex transmission, comprising:

determining maximum decoding iteration counts of respective received code words based on modulation schemes and error-correcting coding ratios which are applied to the received code words and average error ratios of the received code words before the code words are decoded; and decoding each of the received code words according to a determined maximum decoding iteration count.

There is also provided a program for decoding a plurality of code words when the code words are sent by way of multiplex transmission, which program executes:

a process of determining maximum decoding iteration counts of respective received code words based on modulation schemes and error-correcting coding ratios which are applied to the received code words and average error ratios of the received code words before the code words are decoded; and a process of decoding each of the received code words according to a determined maximum decoding iteration count.

With the present invention thus arranged, a decoding process in which the decoder has a reduced circuit scale can be performed even if different modulation schemes and different error-correcting coding ratios are applied to respective code words which are received.

BEST MODE FOR CARRYING OUT THE INVENTION

An exemplary embodiment of the present invention will be described below with reference to the drawings.

Figure 1:
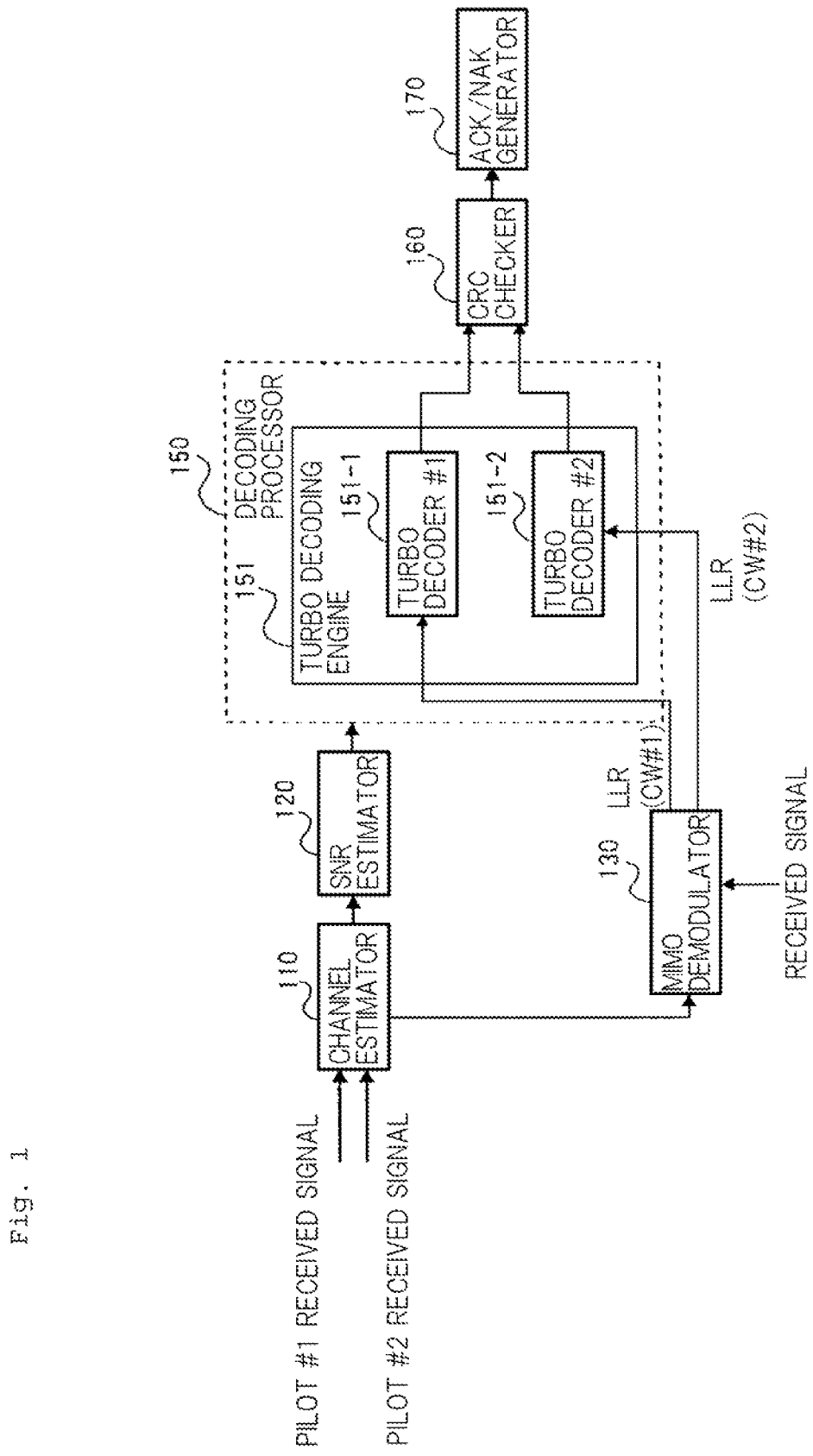
FIG. 1 is a diagram showing an example of a receiver using a plurality of decoders.
Figure 2:
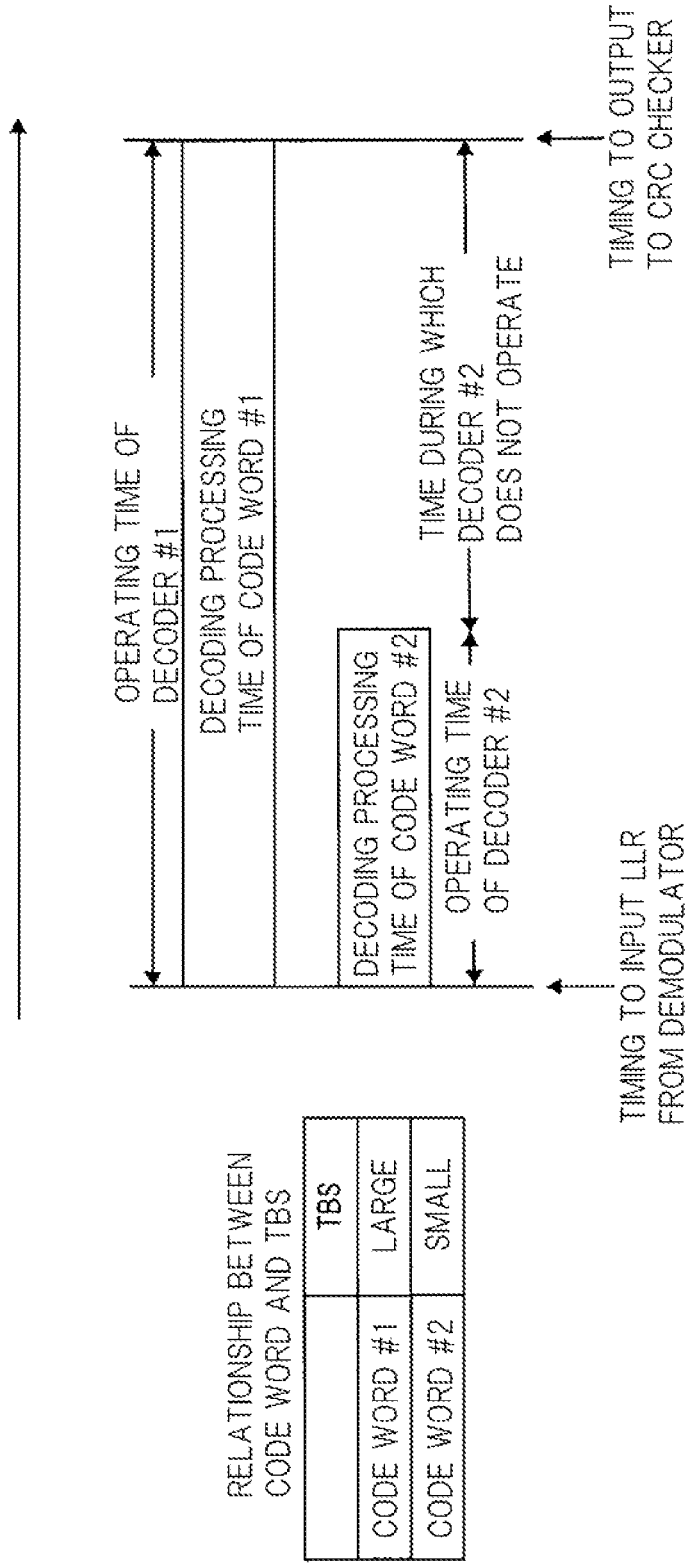
FIG. 2 is a diagram showing an example of decoding processing times at the time respective code words have different TBSs in a turbo decoding engine shown in FIG. 1.
Figure 3:
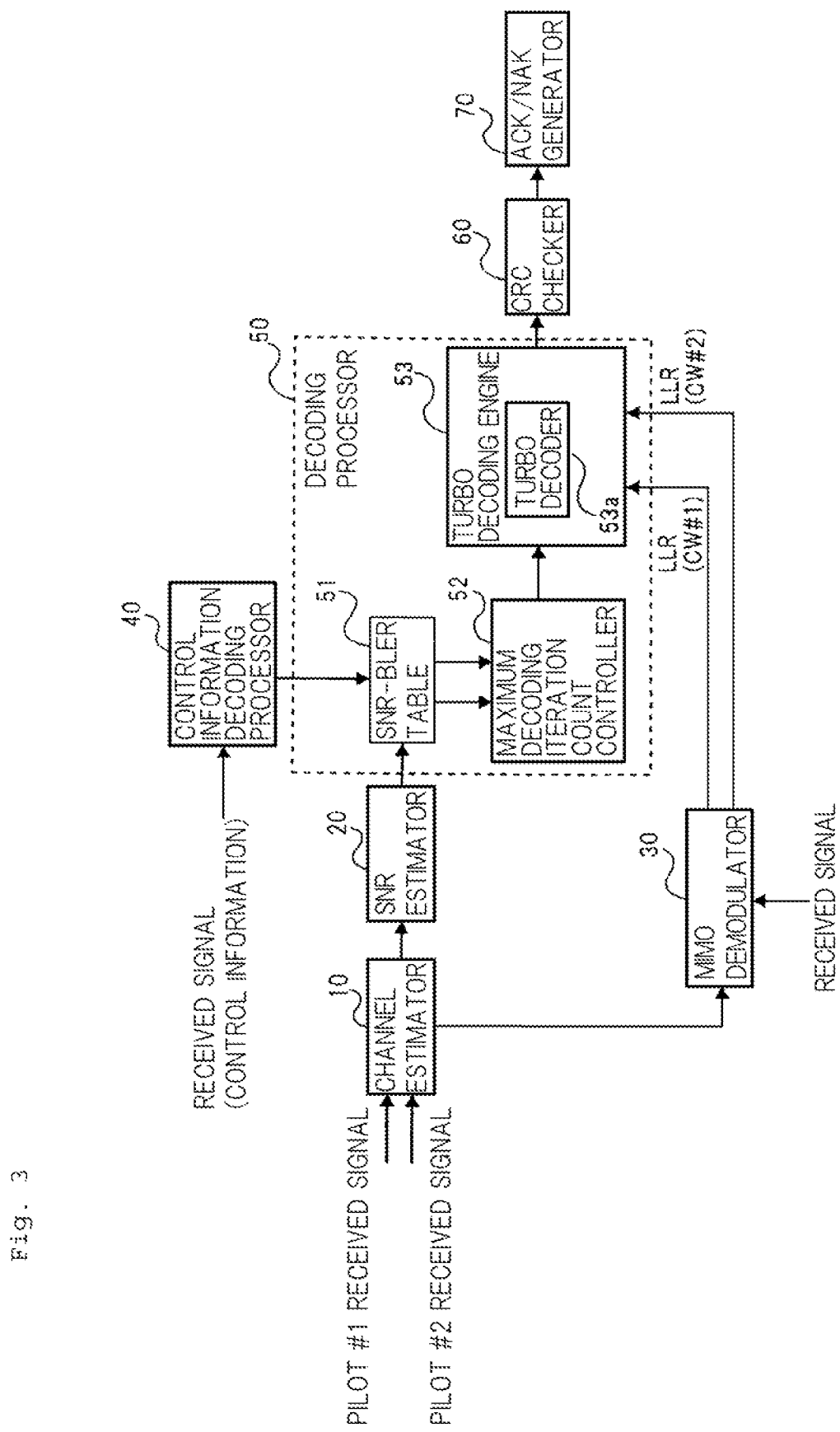
FIG. 3 is a diagram showing an exemplary embodiment of a receiver incorporating a decoding device according to the present invention.

FIG. 3 is a diagram showing an exemplary embodiment of a receiver incorporating a decoding device according to the present invention.

As shown in FIG. 3, the receiver according to the present exemplary embodiment includes channel estimator 10 for estimating channels using received signals of pilot symbols from respective transmission antennas, SNR estimator 20 for calculating SNRs (Signal to Noise Ratios) at respective reception antennas from the channels of the pilot symbols estimated by channel estimator 10, MIMO demodulator 30 for separating signals sent by way of MIMO multiplex transmission, decoding processor 50 for decoding code words from MIMO demodulator 30 using the LLR (Log Likelihood Ratio) of the code words, CRC checker 60 for performing a CRC check on estimated code words that are produced from decoding processor 50 which decodes the code words, ACK/NAK signal generator 70 for generating information to be fed back to the transmitter, and control information decoding processor 40 for obtaining modulation schemes and error-correcting coding ratios (MCS information: Modulation and Coding Scheme) applied to the received code words by decoding the channels including received control information. Decoding processor 50 comprises SNR-BLER table 51 as SNR-BLER holding means for holding an SNR and an average error rate (BLER: BLock Error Rate) for'each MCS information in RAM, maximum decoding iteration count controller 52 for estimating a BLER corresponding to the SNR of each received code word by referring to the information held by SNR-BLER table 51 and by determining a maximum decoding iteration count for each received code word based on the BLER and the MCS information obtained by control information decoding processor 40, and turbo decoding engine 53 as decoding executing means for performing a turbo decoding process according to the maximum decoding iteration count determined by maximum decoding iteration count controller 52. Turbo decoding engine 43 has single turbo decoder 53a. In the present exemplary embodiment, it is assumed that the modulation schemes of QPSK, 16QAM, and 64QAM and the error-correcting coding ratios of 1/3, 1/2, 3/4, and 5/6 are applicable as the MCS of each code word.

An operation sequence of the receiver thus constructed for receiving signals and decoding code words will be described below.

Figure 4:
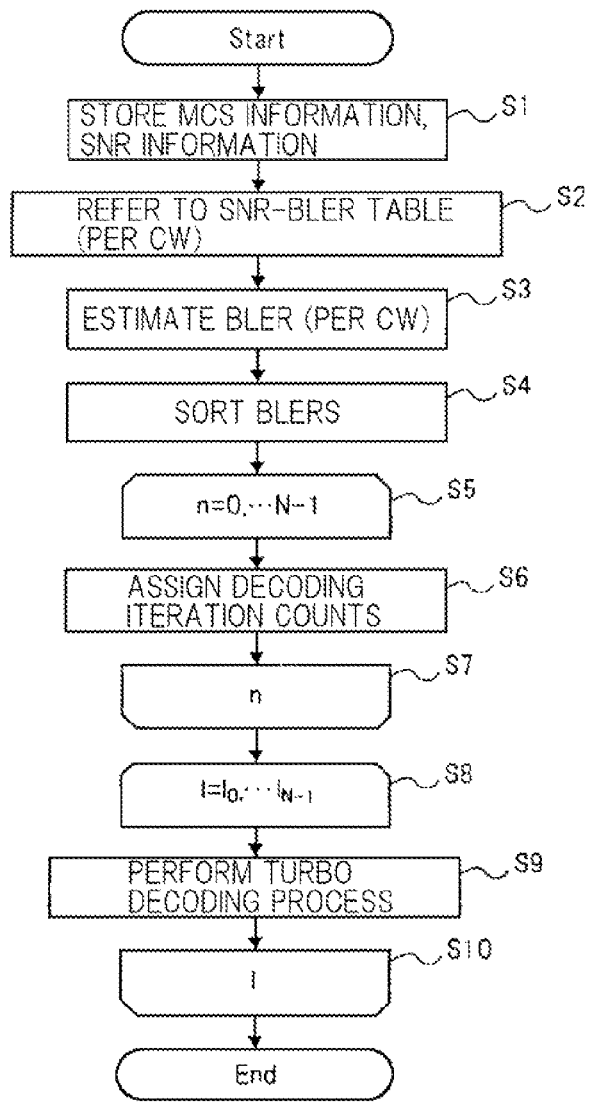
FIG. 4 is a flowchart of an operation sequence of the receiver shown in FIG. 3 for receiving signals and decoding code words.

FIG. 4 is a flowchart of an operation sequence of the receiver shown in FIG. 3 for receiving signals and decoding code words.

When the receiver receives signals, channel estimator 10 estimates channels using pilot signals of received signals #1, #2, and calculates estimated channel values of respective wireless resources.

Then, SNR estimator 20 calculates SNRs at the respective reception antennas using the estimated channel values of the pilot signals which have been calculated by channel estimator 10.

The channels including control information are decoded to solve MCS information (modulation schemes and error-correcting coding ratios) applied to respective code words.

An SNR and an average error rate (BLER: BLock Error Rate) for each MCS information are calculated in advance by way of simulation, and their association is held in SNR-BLER table 51 (step 1). SNR-BLER table 51 has values depending on demodulation algorithms (e.g., MMSE, MLD, etc.) for MIMO multiplex transmission. SNR-BLER characteristics in an AWGN communication path are determined for each of the combinations of the modulation schemes of QPSK, 16QAM, and 64QAM and the error-correcting coding ratios of 1/3, 1/2, 3/4, and 5/6, and are stored as a table in the RAM of the receiver.

Maximum decoding iteration count controller 52 refers to the information held in SNR-BLER table 51 (step 2), and estimates BLERs corresponding to the SNRs of the received code words before the code words are decoded (step 3).

Maximum decoding iteration count controller 52 sorts the estimated BLERs in descending order of error ratios and BLERs (step 4). After having finished this process for all the code words (step 5), maximum decoding iteration count controller 52 determines a maximum decoding iteration count for each of the received code words based on the estimated BLERs and the MCS information obtained by control information decoding processor 40, and allocates the determined maximum decoding iteration count (step 6).

Figure 5:
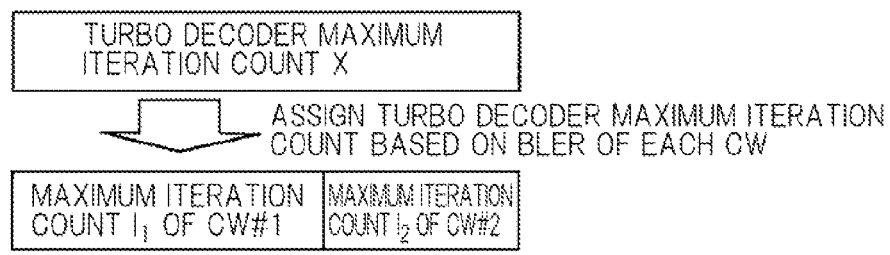
FIG. 5 is a diagram showing the allocation of a maximum decoding iteration count in the receiver shown in FIG. 3.

FIG. 5 is a diagram showing the allocation of a maximum decoding iteration count in the receiver shown in FIG. 3. In the present exemplary embodiment, it is assumed that a processing delay time allowed for a soft-decision iterative decoding process in the overall system is predetermined, and a maximum decoding iteration count of the iterative decoder is determined from the processing delay time and the clock cycle (here, the maximum decoding iteration count is assumed to be "X").

As shown in FIG. 5, maximum decoding iteration count controller 52 dynamically determines a decoding iteration count, within the maximum decoding iteration count X, to be assigned to the decoding process for each of the code words, based on the estimated BLER and the MCS information obtained by control information decoding processor 40 (each time the MCS information is indicated to the receiver).

Maximum decoding iteration count controller 52 assigns decoding iteration counts to the respective code words in descending order of BLERs according to the principle that a greater decoding iteration count is assigned to a code word having a greater BLER and a smaller decoding iteration count is assigned to a code word having a smaller BLER (steps 7, 8). For example, if the modulation schemes for two code words are QPSK (code word #1) and 16QAM (code word #2), respectively, and if the error-correcting coding ratios for the two code words are 1/3, then the BLERs of the respective code words are about $10^{-2}$ (code word #1) and $10^{-1}$ (code word #2), respectively. Using the ratio of these BLERs, maximum decoding iteration count controller 52 assigns a greater decoding iteration count to a code word that has a greater BLER before it is decoded and assigns a smaller decoding iteration count to a code word that has a smaller BLER before it is decoded, within the maximum decoding iteration count X of the turbo decoding engine which has been determined from the processing time allowed for the turbo decoding engine from the standpoint of delaying the process of the overall apparatus ($I_1+I_2=X$).

Thereafter, turbo decoder 53a of turbo decoding engine 53 performs a turbo decoding process in the order (TDM: Time Division Multiplex) of code word #1, code word #2, using maximum decoding iteration counts $I_1$, $I_2$ defined for the respective code words (steps 9, 10). Insofar as the TDM process is performed, the code words may be input in any order to the turbo decoding engine.

According to the present exemplary embodiment, if there are a plurality of code words (multiple code words) in the MIMO (Multiple Input Multiple Output) multiplex transmission, then decoders are not employed for the respective code words, but a single decoder is employed to decode all the code words by scheduling the maximum decoding iteration counts for the respective code words based on the MCS information and the reception SNRs applied to the respective code words.

The decoding apparatus can be used in receivers of wireless communication systems to which the multiple code word transmission is applied as the MIMO multiplex transmission.

(Other Exemplary Embodiments)

In the above exemplary embodiment, the number of code words is 2 for 2×2 MIMO multiplex transmission. However, the present invention is not limited to such a configuration. The antenna configuration of the MIMO multiplex transmission does not depend on the 2×2 configuration, but the present invention is applicable to other antenna configurations such as a 4×4 configuration.

In the above exemplary embodiment, there are two code words. However, the present invention is not limited to two code words, but is also applicable to three or more code words.

According to the present invention, the processing sequence in the decoding apparatus may be implemented by the dedicated hardware described above, and may also be implemented by recording programs for realizing the functions of the decoding apparatus in a recording medium which can be read by the decoding apparatus, reading the programs recorded in the recording medium into the decoding apparatus, and executing the read programs. The recording medium which can be read by the decoding apparatus may refer to an IC card, a memory card, a removable recording medium such as a floppy disk (registered trademark), a magnetooptical disk, a DVD, a CD, or the like, or an HDD or the like incorporated in the decoding apparatus. The programs recorded in the recording medium are read by a control block, for example, and the control block performs a control sequence to carry out the same processes as described above.

The present invention has been described above in reference to the exemplary embodiments. However, the present invention is not limited to the above exemplary embodiments. Rather, various changes that can be understood by those skilled in the art within the scope of the invention may be made to the arrangements and details of the present invention.

The present application is the National Phase of PCT/JP2009/050614, filed Jan. 19, 2009, which is based upon and claims the benefit of priority from Japanese patent application No. 2008-044377, filed on Feb. 26, 2008, the disclosure of which is incorporated herein in its entirety by reference.

The invention claimed is:

1. A decoding apparatus for decoding a plurality of code words when the code words are sent by way of multiplex transmission, comprising:

maximum decoding iteration count control means for determining maximum decoding iteration counts of respective received code words based on modulation schemes and error-correcting coding ratios which are applied to the received code words and average error ratios of the received code words before the code words are decoded; and decoding executing means for decoding each of the received code words according to a maximum decoding iteration count determined by said maximum decoding iteration count control means.

2. The decoding apparatus according to claim 1, further comprising:

SNR-BLER holding means for holding signal to noise ratios and said average error ratios in association with each other for the respective modulation schemes and the respective error-correcting coding ratios;

wherein said maximum decoding iteration count control means refers to information held by said SNR-BLER holding means and estimate average error ratios corresponding to the signal to noise ratios of the received code words.

3. A decoding method for decoding plurality of code words when the code words are sent by way of multiplex transmission, comprising:

determining maximum decoding iteration counts of respective received code words based on modulation schemes and error-correcting coding ratios which are applied to the received code words and average error ratios of the received code words before the code words are decoded; and;

decoding each of the received code words according to a determined maximum decoding iteration count.

4. The decoding method according to claim 3, further comprising:

holding signal to noise ratios and said average error ratios in association with each other for the respective modulation schemes and the respective error-correcting coding ratios; and referring to information which is held and estimating average error ratios corresponding to the signal to noise ratios of the received code words.

5. A non-transitory computer readable medium comprising a program for decoding a plurality of code words when the code words are sent by way of multiplex transmission, which program executes:

a process of determining maximum decoding iteration counts of respective received code words based on modulation schemes and error-correcting coding ratios which are applied to the received code words and average error ratios of the received code words before the code words are decoded; and a process of decoding each of the received code words according to a determined maximum decoding iteration count.

6. The non-transitory computer readable medium comprising a program according to claim 5, which executes:

a process of holding a signal to noise ratio and said average error ratios in association with each other for the respective modulation schemes and the respective error-correcting coding ratios; and a process referring to information which is held and estimating average error ratios corresponding to the signal to noise ratios of the received code words.

* * * * *